Aug. 1, 1939.  J. R. JACKSON  2,168,162
TOOL POST AND HOLDER
Filed Jan. 31, 1938  2 Sheets-Sheet 1

Inventor
John R. Jackson
By attorney

Aug. 1, 1939.   J. R. JACKSON   2,168,162
TOOL POST AND HOLDER
Filed Jan. 31, 1938   2 Sheets-Sheet 2
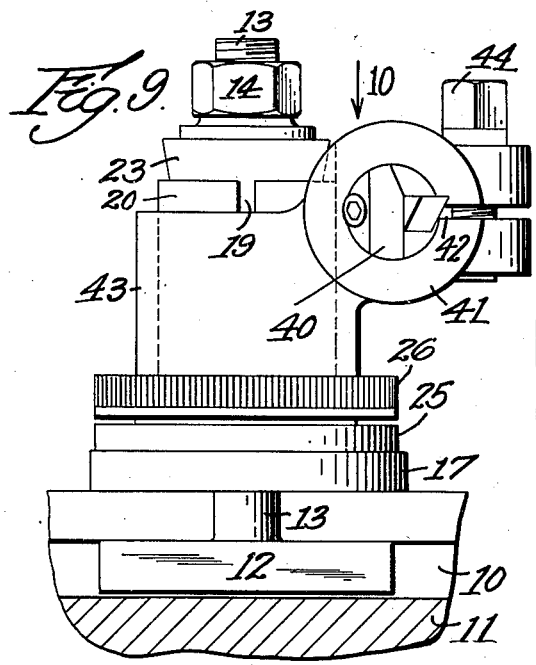
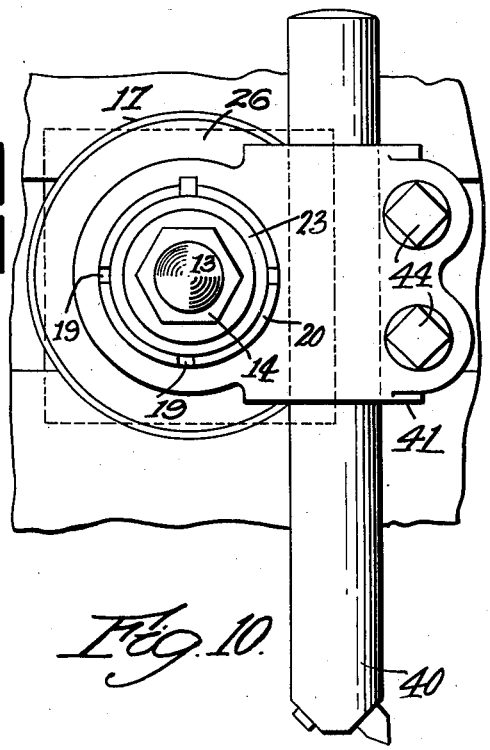
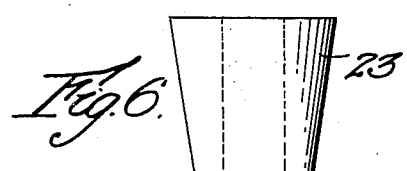
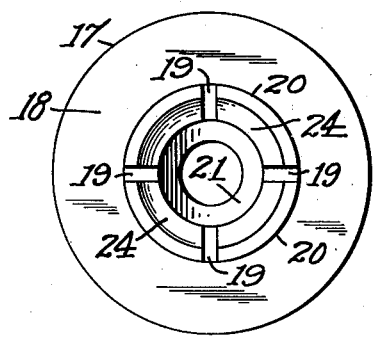
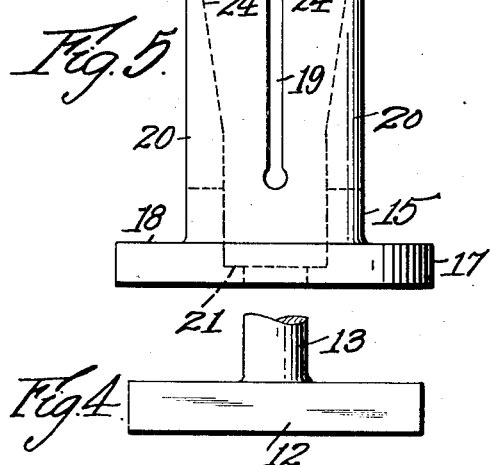
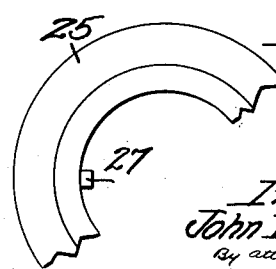
Inventor
John R. Jackson
By attorney
A. T. Fay Patented Aug. 1, 1939

REISSUED
JUN 17 1941

2,168,162

UNITED STATES PATENT OFFICE 2,168,162

TOOL POST AND HOLDER

John R. Jackson, Boston, Mass.

Application January 31, 1938, Serial No. 187,787

2 Claims. (Cl. 82—36)

This invention relates to a device for holding tools of various kinds on a lathe or other machine tool.

The principal objects of the invention are to provide a construction in which the tool holder, having a hollow cylindrical base, can be held entirely by internal pressure against the concave surface of said hollow base; to provide a construction in which such pressure is produced by the screwing down of a nut, or the like, freely exposed at the top of the tool post, thus providing a very simple means for clamping and unclamping the tool; to provide a conical member for use in cooperation with said internal conical construction to produce the pressure desired and yielding means inside the tool post for resisting the pressure of said conical member and freeing the conical member when its pressure is no longer desired, and to provide means for adjusting the height of the tool holder, also concentric with the parts described above.

Other objects and advantages of the invention will appear hereinafter.

Reference is to be had to the accompanying drawings, in which

Fig. 4 is a side view of the base for the tool post;

Fig. 5 is a similar view of the clamping member of the tool post;

Fig. 6 is a similar view of the member for applying pressure to operate the clamping member;

Fig. 7 is a plan of the member shown in Fig. 5 as indicated by the arrow 7 in that figure;

Fig. 8 is a fragmentary plan of the height adjusting ring;

Fig. 9 is a side view, and

Fig. 10 is a plan showing the invention as applied for carrying a boring tool.

Figure 1:
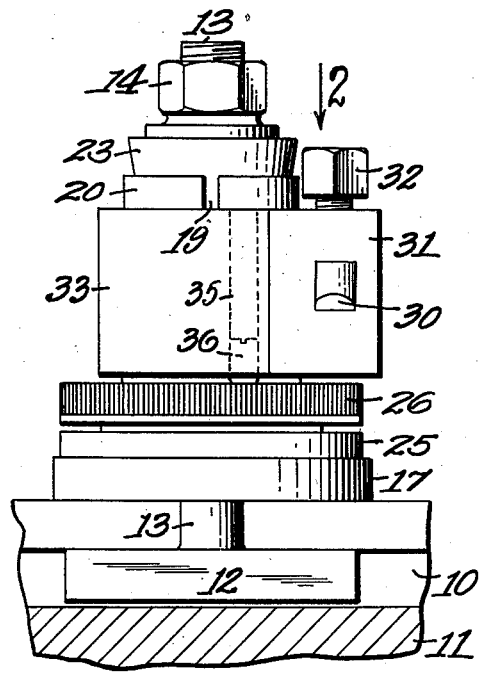
Fig. 1 is a side view of a tool post constructed in accordance with the principles of this invention, with one form of tool carried thereby.
Figure 3:
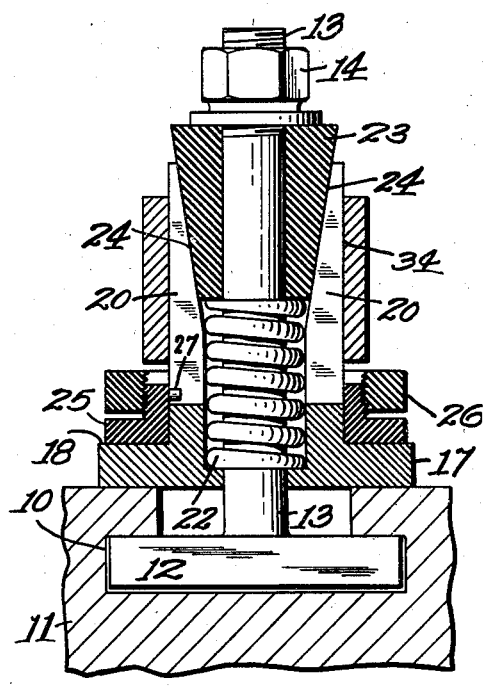
Fig. 3 is a sectional view on the line 3—3 of Fig. 2.
Figure 2:
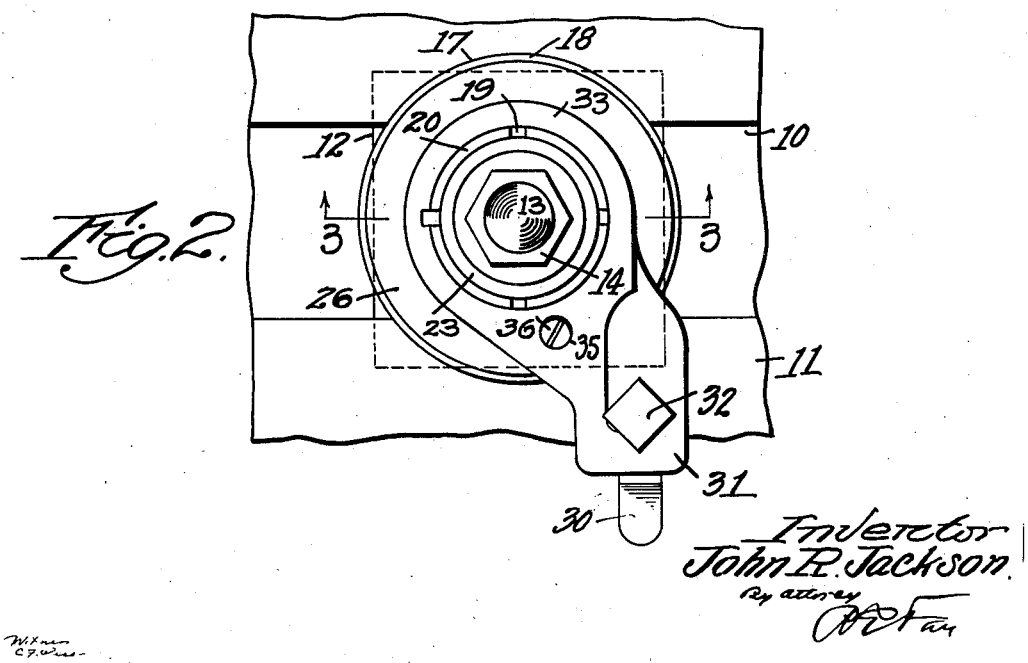
Fig. 2 is a plan of the same, as indicated by the arrow 2 in Fig. 1.

This invention is designed in part to eliminate the bolts and screws that ordinarily are employed for tightening up a tool in a tool post and especially for concentrating the parts for holding the tool in the small space about a vertical axis. The invention is shown as applied to the T-slot 10 of the slide 11 of a lathe, or the like, for receiving therein a base 12 constituting the clamping means for this tool post.

From the base 12 extends upwardly and integrally a heavy rod 13 which is screwthreaded at the top for receiving a nut 14. Surrounding this rod is a clamping member 15. This member is provided with a disc-like bottom member 17 concentric with the rod 13 and with a flat surface 18 of annular form at the top of the same. It also extends up nearly to the top of the instrument with an accurate cylindrical outside clamping surface which is provided with radial slots 19 from the top nearly to the bottom to provide resiliency. Inside, the tongues 20 between these several slots 19 are tapered so that together they constitute an internal conical surface smaller at the bottom than at the top. The steel is strong but elastic to permit of pressure being applied to it for the purpose intended. At the bottom is an annular shelf 21 having a perforation for the rod 13 and serving as a support for an internal spring 22. Resting on this spring is a cone 23 which is perforated centrally and centered on the rod 13. This cone is adapted to rest against the internal conical surface 24 and, when pressure is applied to the cone, force this clamping member 15 to expand and clamp the interior of a tool holder 33 carrying a tool, as will appear. The nut 14 rests on the top of the cone 23 and it is by this means that the cone is forced downwardly and the tool post extended to screw the tool holder in the desired fixed position.

An adjusting means is provided comprising a nut 25 for fine adjustment, resting on the surface 18, provided with a vertical tubular portion on the upper side having an external screwthread and a knurled nut 26 having a screwthread fitting the same and adapted to furnish on its top the surface for supporting the tool holder proper. This ring 25 is provided with a radial pin or key 27 which extends into one of the slots 19 and holds the ring 25 in stationary position while the nut is being turned to clamp it.

Any ordinary lathe tool can be supported by this means, such as a screwthreading tool, a cutting tool 30, a boring bar 40, or a cutting off tool. This cutting tool is shown as fixed to a projection 31 on a vertical cylindrical member 33 by an ordinary bolt fastening 32. The tool holder 33 is in turn provided with an inside cylindrical surface 34, adapted to fit about the member 15 and to be clamped thereto solely by the downward motion of the cone 23. This member 31 is also provided with a vertical passage 35 in which is a screw 36 adapted to project at the bottom to engage the top of the nut 26 and control the height of the tool. Thus the tool can be adjusted to the desired height, taken off, and put back at the same level, without making any further adjustment.

The same tool post is shown in Figs. 9 and 10 for carrying a tool holder for a boring bar 40. No changes are required except in the tool holder, which in this case has the hollow cylindrical member 43 for receiving the tool post. In this case its projection 41 is located at the side of the tool post and is shown as slit longitudinally at 42 to receive two fastening bolts 44. It has a horizontal passage for the boring bar 40.

From this it will be seen that the tool can be set at any desired height and it can be clamped by the use of a wrench on the nut 14 in a very well exposed and convenient position. Not only is the leverage of the wrench fully available for use in all positions of the wrench but there is nothing likely to injure the knuckles of the operator and the entire force for clamping the tool in position is provided integrally through the operation of the cone 23. Of course, the cutting tool holder 34 and boring tool holder 43 are used for illustrative purposes and any of the other tools above mentioned or others can be substituted for it.

Having thus described my invention and the advantages thereof, I do not wish to be limited to the details herein disclosed, otherwise than as set forth in the claims, but what I claim is:

1. In a tool post, the combination with a base and rod projecting vertically upwardly therefrom, of a clamping member having a central passage for receiving the rod and provided with an upwardly extending cylindrical diametrically slotted member having an external clamping surface, means for expanding said clamping surface, a tool holder surrounding said member, a disc surrounding the bottom of said clamping surface having a radial pin extending into the slot in said member for holding it against rotation, and a knurled nut at the bottom of said clamping surface screwthreadedly connected with said disc for adjusting the elevation of the tool holder.

2. In a tool post, the combination of a base, a rod projecting vertically upwardly therefrom and having a screwthread on the top, a nut on the screwthread for operating the tool post, a cone under the nut to be pushed down thereby, a vertical clamping member having a central passage for receiving the rod and cone and provided with an external clamping surface, said member being provided with vertical radial slots extending all the way through it and being of a conical internal shape at the upper end to fit said cone to receive pressure therefrom to transmit it to the outer surface, a bottom disc spaced under said clamping member and having a central space, a spring supported in said space and engaging the cone, a ring resting on said bottom and having means for preventing the turning of said clamping member, the ring having a screwthread, and a nut on said screwthread for adjusting the height of the clamping member.

JOHN R. JACKSON.